United States Patent Office 3,264,276
Patented August 2, 1966

3,264,276
POLYOLEFIN MODIFIED WITH A HYDRAZINIUM HYDROXIDE
Paul R. Steyermark and Rajendra N. Chadha, Silver Spring, Clifton L. Kehr, Ednor, and Richard W. Bush, Takoma Park, Md., assignors to W. R. Grace & Co., New York, N.Y., a corporation of Connecticut
No Drawing. Filed Jan. 28, 1963, Ser. No. 254,445
9 Claims. (Cl. 260—88.2)

The present invention relates to novel derivatives of oxidized polyolefins, and more specifically, to oxidized polyolefins which have been modified with polar substituents to enhance the physical characteristics thereof.

Polyolefins, and in particular polyethylene and polypropylene, have long been recognized as useful and economical polymers. These polymers exhibit strength and chemical characteristics which render them useful in the form of both films and molded shapes. More recently, polyolefins have been dispersed in liquid media and used as coating and impregnating compounds.

While for many uses polyolefins exhibit desirable characteristics such as chemical inertness and insolubility in polar solvents due to their inherent non-polar carbon-hydrogen structure, it has frequently been thought that the utility of polyolefins could be extended if some degree of polarity could be imparted to their structure. For example, dispersions of polyethylene in water should readily be achieved without the use of auxiliary surface active agents if in some way the molecule could be rendered more polar. Furthermore, the annoying and sometimes dangerous characteristics of polyolefins to accumulate static electric charge would be lessened if the conductivities thereof were increased through the insertion of polar type substituents.

Prior art attempts to physically incorporate highly polar materials within or upon polyolefin structures have been generally unsatisfactory. Polar compounds do not blend satisfactorily with polyolefins and surface treatment is only temporary at best.

It is therefore an object of the present invention to modify polyolefins by the incorporation of a polar type substituent upon the carbon backbone thereof.

It is another object to provide polyolefins which possess an improved degree of dispersibility in polar solvents.

It is a further object to provide a modified polyolefin which exhibits desirable antistatic characteristics.

It is still another object to provide a method by which oxidized polyolefins which contain free carboxyl and carbonyl groups may be conveniently and economically substituted with polar type substituents.

It is still a further object to provide a method by which desirable dispersibility, antistatic, and fungicidal characteristics may be imparted to polyolefins.

These and still further objects of the present invention will become readily apparent to one skilled in the art from the following detailed description and specific examples.

In general, the present invention contemplates novel hydrazinium derivatives of oxidized polyolefins which are prepared by reacting an appropriate hydrazinium compound with free carboxyl and carbonyl groups characteristically possessed by oxidized polyolefins.

More specifically, the invention involves reaction products of oxidized polyolefins and hydrazinium which presumably contain the following groupings:

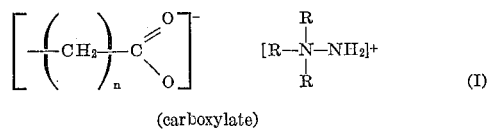

(carboxylate)

and

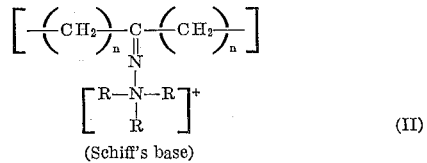

(Schiff's base)

wherein

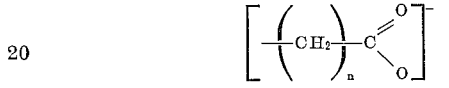

and

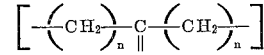

represent residues obtained from oxidized polyolefins containing carboxyl and carbonyl groups, $n$ represents the number of repeating methylene groups occurring between the carboxyl or carbonyl residue and the next similar unit or terminating methyl group, and R represents an organic radical.

The precise value for $n$ in the above formula depends on the molecular weight of the initial polyolefin and the amount of oxidation which has been imparted thereto. Under ordinary circumstances this value of $n$ will vary from about 50 to about 1000 and the number of hydrazinium carboxylate or Schiff's base groupings which occur per molecule of polyolefin will vary from about 0.1 to about 15. It is seen that the groupings or the groupings defined as (I) above is a hydrazinium carboxylate formed between the carboxyl radical and the basic hydrazinium cation. The groupings illustrated as (II) above possesses the structure that is characteristic of a Schiff's base.

Hydrazinium salts which may be used in the practice of the present invention have the general formula:

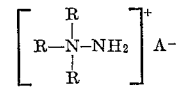

wherein R represents organic substituents and A is an anion, preferably hydroxyl (OH⁻). The radicals which R may represent are numerous and varied. U.S. Patent 2,955,108 to Omietanski illustrates the great number of different organic substituents which may be present in a hydrazinium molecule. It is well within the scope of this invention to form oxidized polyolefin derivatives with hydraziniums disclosed by the Omietanski patent as well as elsewhere in the literature. Thus the properties of the polyolefins may be varied in numerous ways depending on the particular hydrazinium selected.

For example, it is found that polyolefins which have been modified with hydraziniums possess improved wetting properties in polar liquids. This improvement, i.e., increase, in wetting properties is attributed directly to the nature of the individual hydrazinium which is highly surface active.

Oxidized polyolefins which are used in the practice of the present invention are generally well known. They may be prepared by direct oxidation of hydrocarbon polymeric chains. For example polyolefins can be milled in air at a temperature in the range of 100–250° C. Another method would include passing air into an oven over a polyolefin maintained therein in the solid state at a temperature of about 90–140° C. Still another method involves the suspension or solution of particles of the polyolefin in an organic solvent and then passing air through the suspension or solution at atmospheric pressure or under positive pressure at a temperature in the range of 90–200° C. Still another convenient way for oxidizing polyolefins involves passing air through a fluidized bed of polyolefin particles maintained at a temperature of 90–140° C. The method by which the oxidized polyolefins used herein are obtained is not critical. However, it is preferred that the oxidized polyolefins possess from about 0.03 to about 3.0 milliequivalents of oxygen per gram. About half of this oxygen which is incorporated in the polyolefin is inherently in the form of carbonyl and carboxyl groups which are important to the formation of the hydrazinium derivatives disclosed herein.

The initial polyolefins which are to be oxidized may be either linear or branched polyethylenes, or copolymers of ethylene with α-olefins in which ethylene is the major component, i.e., in excess of about 50% by weight, which are characterized by possessing densities of from about 0.91 to about 0.98 and melt indices of from about 0.00 to about 1.0.

As mentioned previously practically any hydrazinium compound having the characteristic structure

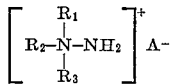

may be used in the practice of the present invention.

Hydraziniums of particular interest are those wherein $R_1$, $R_2$ and $R_3$ are selected from the group comprising alkyl having 1 to 24 carbon atoms, alkenyl having 2 to 24 carbon atoms, cycloalkyl having up to 6 carbon atoms, phenyl, alkylphenyl wherein the alkyl substituent possesses 1 to 12 carbon atoms, hydroxyalkyl wherein the alkyl group possesses 2 to 12 carbon atoms, and hydroxypolyethoxyethyl wherein the radical possesses up to 25 ethoxy groups. Furthermore, $R_1$ and $R_2$ may be joined together to form a heterocyclic ring structure having at least 3 and not more than 8 numbers which may be atoms such as carbon and oxygen. $A^-$ represents an anion such as hydroxide, halogen or sulfate.

Specific examples of useful hydrazinium compounds are:

1,1-bis(perhydrotallow)-1-methylhydraziniumchloride
1,1-dimethyl-1-"soya"hydraziniumchloride
1,1-dimethyl-1-[p-(2,4,4-trimethylamyl-2)phenoxyethoxyethyl-1-]hydraziniumchloride
1,1-bis(2-hydroxyethyl)-1-[3-(N-2'-hydroxyethyl)-N-octoadecyl aminopropyl-1-]hydraziniumchloride
1,1-dimethyl-1-octadecylhydraziniumchloride
1,1-dimethyl-1-phenylhydraziniumchloride
1,1-dimethyl-1-(2-hydroxyethyl)hydraziniumchloride
1,1-bis(hydroxyethyltetraethoxy)-1-octadecyl hydraziniumchloride
1,1-bis(hydroxytetracosaethoxyethyl)-1-octadecyl hydraziniumchloride
1-(hydroxyethylheptaethoxy)-1-(hydroxyethyl hexaethoxy)-1-"soya"hydraziniumchloride
1-amino-1-hydroxyethylmorpholiumchloride
1-amino-1-"tallow"morpholiniumchloride
1,1-bis(coco)-1-methylhydraziniumchloride
1,1-dimethyl-1-hexadecylhydraziniumchloride
1,1-dimethyl-1-"coco"hydraziniumchloride
1,1-dimethyl-1-dodecylhydraziniumchloride
1,1,1-trimethylhydraziniumchloride
1-"coco"-1-aminomorpholiniumchloride
1-(hydroxyethoxyethyl)-1-(hydroxyethoxyethyl)-1-tallow
1,1-diethyl-1-cyclohexylhydraziniumchloride
1,1-bis(soya)-1-methylhydraziniumchloride
1,1,1-triethylhydraziniumchloride
1,1-bis(perhydrotallow)-1-methylhydraziniumbromide
1,1-bis(perhydrotallow)-1-methylhydraziniumiodide
1,1-dimethyl-1-hexadecylhydraziniumbromide
1,1-dimethyl-1-hexadecylhydraziniumiodide
1,1-dimethyl-1-(α-methylbenzyl)hydraziniumchloride
1,1-dimethyl-1-dodecylhydraziniumiodide
1,1,1-trihexylhydraziniumchloride
1-amino-1-methylmorpholium chloride
1,1-bis(2-hydroxyethyl)-1-octadecyl hydrazinium chloride
1,1-dimethyl-1-(hydrotallow) hydrazinium chloride
1,1-dimethyl-1-dodecyl hydrazinium bromide
1-methyl-1-benzyl-1 [2(p-t-octyl phenoxyethoxy) ethyl] hydrazinium chloride
p,p' Benzylidine bis (N,N-dimethylaniline)-hydroxylamine-O-sulfonic acid adduct
Triethanolamine hydrazinium chloride
1,1,1-trihydropolyethoxyethyl hydrazinium chloride The hydrazinium-polyolefin compounds of the present invention may be conveniently prepared by dissolving an oxidized polyolefin in a solvent therefor at elevated temperatures of from about 70° to about 150° C., and then combining the polyolefin solution with a solution of the desired hydrazinium.

Typical solvents for oxidized polyolefin are xylene, toluene, decahydronaphthaline, and benzene.

The hydrazinium which is to be incorporated in the oxidized polyolefin molecule in preferably converted to its hydroxide or alkoxide form. This may conveniently be done by contacting a hydrazinium halide or sulfate with set silver oxide, or sodium hydroxide, or by passing a solution of the hydrazinium halide or sulfate through a hydroxyl bearing ion exchange resin. The hydrazinium alkoxide may be obtained by reacting the halide with an alkali metal alkoxide. The hydrazinium hydroxide is then dissolved in a suitable solvent such as diethylene glycol, xylene, benzene, propylene glycol and decahydronaphthalene.

The solutions of oxidized polyolefin and hydrazinium hydroxide are combined and thoroughly mixed at temperatures which will maintain the initial reactants in solution. The solution is subsequently cooled, whereupon the desired carboxylate—Schiff's base mixture will precipitate and may be separated from the reaction mixture by conventional filtering techniques.

In the event the hydrazinium compound is incorporated into the polyolefin in the form of a salt of a strong acid, i.e., halide or sulfate, carboxylate formation will not occur, and Schiff's base formation occurs exclusively. This is due to the fact the carboxylic acids of oxidized polyolefins are not strong enough to displace the anion of a strong inorganic acid. Thus where carboxylate formation is desired, the hydroxide form of the hydrazinium is required.

Alternatively, the desired compounds may be formed by direct blending of the hydrazinium with the molten oxidized polyolefin in an appropriate hot-blending mill. When this technique is used, care should be taken not to exceed temperatures which will cause degradation of the particular hydrazinium being used. Temperatures in the range of from about 115 to about 225° C. are generally suitable.

Having disclosed the basic aspects of the present invention the following examples are given to illustrate specific embodiments thereof.

Example 1

20 grams of oxidized polyethylene which contained 0.49 milliequivalent of free carboxyl groups per gram was dissolved in 400 milliliters of xylene. The initial unoxidized polyethylene possessed a density of 0.95 and a melt index of 0.00. To the polyethylene-xylene solution, a solution comprising 29 milliequivalents of N.N-dimethyl-N-hexadecyl hydrazinium hydroxide dissolved in 25 milliliters of diethylene glycol was added. The combined solutions were well mixed and subsequently cooled from an initial temperature of about 120 down to a temperature of about 0° C. A precipitate formed which was removed from the reaction medium by filtration and washed with toluene and acetone. Analysis indicated that 49% of the starting hydrazinium hydroxide had reacted with the oxidized polyethylene. The solid precipitate which was obtained weighed 24.2 grams and represented a substantially quantitative yield. This precipitated material could be pressed into a bubble-free film at 150° C. using a conventional hydraulic platen press. The polyethylene-hydrazinium derivative possessed a nitrogen content of 1.73% which is equivalent to 0.62 milliequivalents of hydrazinium per gram of oxidized polyolefin. The difference of 13 milliequivalents per gram which existed between the initial titrated value for carboxyl and the final value, was deemed to be in the form of Schiff's base formation. The infrared absorption spectrum indicated a weak absorption at 1640 cm.$^{-1}$, a strong absorption at 1565 cm.$^{-1}$, a medium intensity absorption at 1715 cm.$^{-1}$, and a broad band at 3134 cm.$^{-1}$. Interpretation of this spectrum indicates the presence of Schiff's bases, carboxylate ions, residual carbonyls or tri-alkyl hydrazinium ions, and free $NH_2$ groups.

Example 2

To illustrate one change which occurred in the oxidized polyolefin modified in Example 1, finely ground portions of the initial oxidized polyolefin and the modified polyolefin were vigorously shaken with water. The non-modified polyolefin merely floated on the surface of the water and showed substantially no wetting. On the other hand, the hydrazinium-modified polyolefin immediately formed a suspension in the water, and the surface of the particles appeared to be completely wetted by the water.

Example 3

To a solution of 6 g. of oxidized polyethylene having melt index of 340 and containing 0.41 milliequivalent of carboxyl groups per gram (prepared from high density polyethylene $d=0.955$; reduced specific viscosity 4.5) in 75 ml. of hot xylene there was added a solution of 2 g. of N,N-dimethyl-N-hydrotallow hydrazinium chloride of molecular weight about 370 in 25 ml. xylene. The solution was magnetically stirred near boiling for one hour. Heat was then removed, and the solution was allowed to cool slowly to room temperature, while stirring was maintained. The mixture was then cooled to 0° C. The precipitated material was filtered, washed with benzene and acetone, and vacuum dried. The material weighed 6.4 g. and melted at 124–126°. A physical mixture of oxidized polyethylene and N,N-dimethyl-N-hydrotallow-hydrazinium chloride melted at 87–95°, while the hydrazinium chloride alone melted at 75–80°.

The reaction product was extracted with boiling methanol and vacuum dried over phosphorus pentoxide. The material was found to contain 0.45% of nitrogen, indicating the presence of one mole of the starting hydrazinium for about 6000 g. of polyethylene.

The above specific examples clearly indicate that oxidized polyolefins may be readily combined with hydraziniums to form the respective carboxylate and Schiff's bases thereof. This carboxylate and Schiff's base formation modifies the physical properties of the polyolefin to impart superior characteristics in the form of increased wetability.

We claim:

1. A modified polyolefin formed by the reaction of an oxidized polyolefin selected from the group consisting of oxidized polyethylene and oxidized ethylene-alpha-olefin copolymers containing at least 50% by weight ethylene, and a hydrazinium having the formula

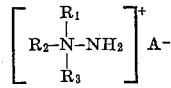

wherein $R_1$, $R_2$ and $R_3$ are selected from the group consisting of alkyl having 1 to 24 carbons, alkenyl having 2 to 24 carbon atoms, cycloalkyl having up to 6 carbon atoms, phenyl, alkyl phenyl, wherein the alkyl substituent possesses 1 to 12 carbon atoms, hydroxy alkyl wherein the alkyl group possesses 2 to 12 carbon atoms, hydroxy polyethoxy ethyl wherein the radical possesses up to 25 ethoxy groups, and $R_1$ and $R_2$ when combined form a heterocyclic ring having from 3 to 8 members comprised of carbon and oxygen, and $A^-$ is selected from the group consisting of hydroxide, halogen, and sulfate.

2. The compositions of claim 1 wherein said reaction product contains from about 0.1 to 15 hydrazinium substituents per molecule of polyolefin.

3. The compositions of claim 1 wherein the oxidized polyolefin contains from about 0.03 to about 3.0 milliequivalents of oxygen per gram.

4. The compositions of claim 1 wherein the polyolefin is polyethylene having an initial non-oxidized density of about 0.91 to about 0.98 and a melt index of from about 0.00 to about 1.0.

5. The composition of claim 1 wherein R represents alkyl radicals having 1 to 24 carbon atoms.

6. A method for preparing a polyolefin of improved dispersibility which comprises forming a solution of hydrazinium hydroxide, having the formula

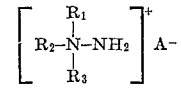

wherein $R_1$, $R_2$ and $R_3$ are selected from the group consisting of alkyl having 1 to 24 carbons, alkenyl having 2 to 24 carbon atoms, cycloalkyl having up to 6 carbon atoms, phenyl, alkyl phenyl, wherein the alkyl substituent possesses 1 to 12 carbon atoms, hydroxy alkyl wherein the alkyl group possesses 2 to 12 carbon atoms, hydroxy polyethoxy ethyl wherein the radical possesses up to 25 ethoxy groups, and $R_1$ and $R_2$ when combined form a heterocyclic ring having from 3 to 8 members comprised of carbon and oxygen, and $A^-$ is selected from the group consisting of hydroxide, halogen, and sulfate, and oxidized polyolefin selected from the group consisting of oxidized polyethylene and oxidized ethylene-alpha-olefin copolymers containing at least 50% by weight ethylene in an inert solvent, heating the solution to a temperature in excess of about 70° C. to obtain reaction between said hydrazinium and said oxidized polyolefin, and recovering carboxylates and Schiff's bases of said hydrazinium and polyolefin from said solution.

7. A method for preparing a polyolefin of improved dispersibility which comprises blending a hydrazinium hydroxide having the formula

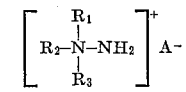

wherein $R_1$, $R_2$ and $R_3$ are selected from the group consisting of alkyl having 1 to 24 carbons, alkenyl having 2 to 24 carbon atoms, cycloalkyl having up to 6 carbon atoms, phenyl, alkyl phenyl, wherein the alkyl substituent possesses 1 to 12 carbon atoms, hydroxy alkyl wherein the alkyl group possesses 2 to 12 carbon atoms hydroxy polyethoxy ethyl wherein the radical possesses up to 25 ethoxy groups, and $R_1$ and $R_2$ when combined form a heterocyclic ring having from 3 to 8 members comprised of carbon and oxygen, and A⁻ is selected from the group consisting of hydroxide, halogen, and sulfate, with an oxidized polyolefin selected from the group consisting of oxidized polyethylene and oxidized ethylene-alpha-olefin copolymers containing at least 50% by weight ethylene at a temperature above the melting point of said polyolefin and below the decomposition temperatures of said hydrazinium to cause reaction between said hydrazinium and said oxidized polyolefin.

8. A method for preparing a polyolefin of improved dispersibility which comprises forming a solution of a strong acid salt of a hydrazinium having the formula

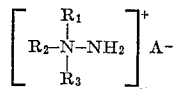

wherein $R_1$, $R_2$ and $R_3$ are selected from the group consisting of alkyl having 1 to 24 carbons, alkenyl having 2 to 24 carbon atoms, cycloalkyl having up to 6 carbon atoms, phenyl, alkyl phenyl, wherein the alkyl substituent possesses 1 to 12 carbon atoms, hydroxy alkyl wherein the alkyl group possesses 2 to 12 carbon atoms, hydroxy alkyl wherein the alkyl group possesses 2 to 12 carbon atoms, hydroxy polyethoxy ethyl wherein the radical possesses up to 25 ethoxy groups, and $R_1$ and $R_2$ when combined form a heterocyclic ring having from 3 to 8 members comprised of carbon and oxygen, and A⁻ is selected from the group consisting of halogen, and sulfate, and oxidized polyolefin selected from the group consisting of oxidized polyethylene and oxidized ethylene-alpha-olefin copolymers containing at least 50% by weight ethylene in an inert solvent, heating said solution to a temperature in excess of about 70° C. to cause reaction between said oxidized polyolefin and said hydrazinium, and recovering Schiff's bases of said hydrazinium and oxidized polyolefin from said solution.

9. A method for preparing a polyolefin of improved dispersibility which comprises blending a strong acid salt of a hydrazinium having the formula:

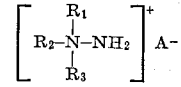

wherein $R_1$, $R_2$ and $R_3$ are selected from the group consisting of alkyl having 1 to 24 carbons, alkenyl having 2 to 24 carbon atoms, cycloalkyl having up to 6 carbon atoms, phenyl, alkyl phenyl, wherein the alkyl substituent possesses 1 to 12 carbon atoms, hydroxy alkyl wherein the alkyl group possesses 2 to 12 carbon atoms, hydroxy polyethoxy ethyl wherein the radical possesses up to 25 ethoxy groups, and $R_1$ and $R_2$ when combined form a heterocyclic ring having from 3 to 8 members comprised of carbon and oxygen, and A⁻ is selected from the group consisting of halogen and sulfate, with an oxidized polyolefin selected from the group consisting of oxidized polyethylene and oxidized ethylene-alpha-olefin copolymers containing at least 50% by weight ethylene at a temperature in excess of the melting point of said polyolefin and below the decomposition temperature of said hydrazinium to cause reaction between said polyolefin and said hydrazinium.

No references cited.

JOSEPH L. SCHOFER, *Primary Examiner.*

E. M. OLSTEIN, L. EDELMAN, *Assistant Examiners.*